United States Patent [19]

Willinsky et al.

[11] Patent Number: 5,251,571

[45] Date of Patent: Oct. 12, 1993

[54] SUBMERSIBLE CAGE SYSTEM FOR CULTURING AQUATIC ANIMALS

[75] Inventors: Michael D. Willinsky, Nepean, Canada; Donald R. Robson, Halifax, Scotland

[73] Assignee: Innovation & Development Partners Inc./IDP Inc., Ottawa, Canada

[21] Appl. No.: 755,042

[22] Filed: Sep. 5, 1991

Related U.S. Application Data

[63] Continuation-in-part of Ser. No. 576,833, Sep. 4, 1990, abandoned.

[30] Foreign Application Priority Data

Jun. 11, 1991 [CA] Canada .................... 2044301

[51] Int. Cl.⁵ .................................... A01K 61/00
[52] U.S. Cl. .................................... 119/215; 441/29; 114/256
[58] Field of Search ............ 119/3; 441/2, 21, 29; 114/256, 257

[56] References Cited

U.S. PATENT DOCUMENTS

| | | | |
|---|---|---|---|
| 4,244,323 | 1/1981 | Morimura | 119/3 |
| 4,252,081 | 2/1981 | Smith | 119/3 |
| 4,257,350 | 3/1981 | Streichenberger | 119/3 |
| 4,312,296 | 1/1982 | Stelleman et al. | 119/3 |
| 4,380,213 | 4/1983 | Blair et al. | 119/3 |
| 4,766,846 | 8/1988 | Lavoie | 119/3 |

FOREIGN PATENT DOCUMENTS

| | | | |
|---|---|---|---|
| 2420920 | 11/1979 | France | 119/3 |
| 2421553 | 12/1979 | France | 119/3 |
| 2531835 | 2/1984 | France | 119/3 |
| 2596613 | 10/1987 | France | |
| 0130198 | 3/1978 | German Democratic Rep. | 119/3 |
| 8203152 | 9/1982 | PCT Int'l Appl. | 119/3 |
| 1191037 | 11/1985 | U.S.S.R. | 119/3 |
| 2031251 | 4/1980 | United Kingdom | |

Primary Examiner—Gene Mancene
Assistant Examiner—Todd E. Manahan
Attorney, Agent, or Firm—Dennison, Meserole, Pollack & Scheiner

[57] ABSTRACT

A submersible cage system for cultivating aquatic animals comprises a rigid frame defining a geodesic enclosure, a net supported by the rigid frame to define a water permeable enclosure for the aquatic animals, the rigid frame being rotatable about a horizontal axis, flotation chambers disposed at opposite sides of the rigid frame, the flotation chambers being alternately fillable with a gas or a liquid to increase or decrease, respectively, the cage system's buoyancy, and a mooring for anchoring the frame in a fixed position in a marine environment.

11 Claims, 14 Drawing Sheets

SUBMERSIBLE CAGE SYSTEM FOR CULTURING AQUATIC ANIMALS

This application is a continuation-in-part of application Ser. No. 576,833 filed Sept. 4, 1990, now abandoned.

FIELD OF THE INVENTION

The present invention relates to apparatus for use in aquaculture of fish and other marine organisms and more particularly to a generally spherical, submersible cage system for culturing aquatic animals adapted for use in harsh exposed marine environments.

BACKGROUND OF THE INVENTION

Commercial scale floating cage systems for the culturing of fish and other aquatic animals are known although the industry is relatively underdeveloped in terms of practical design and operational experience. Accordingly, numerous cage designs have been proposed, none of which has proven completely successful in terms of cost, durability, biological compatibility and economic viability. Most designs, including the present one, share a number of features in common, including a buoyant framework defining the cage, a net or perforated panels supported on the inside or outside of the frame to define an enclosure, means to support the cage for rotation about a central axis so that individual surfaces or portions of the net can be periodically exposed to ambient air for cleaning, repair or replacement and a mechanism for submerging the cages in the event of violent weather, ice, lethally cold water, toxic bloom and other surface hazards.

SUMMARY OF THE INVENTION

It is an object of the present invention to provide an economically and biologically viable submersible cage system for the culturing of fish and other aquatic animals that obviates and mitigates from the disadvantages of the prior art.

According to the present invention, then, there is provided a submersible cage system for cultivating aquatic animals comprising a rigid frame, a net supported by said rigid frame to define a water-permeable enclosure for said aquatic animals, means for rotatably supporting said rigid frame in a fully or partially submerged condition, and means for anchoring said frame in a fixed position in a marine environment, wherein said rigid frame defines a geodesic sphere.

According to a further aspect of the present invention, there is also provided in a submersible cage system for culturing aquatic animals, said system including a rigid frame for supporting a net which defines in combination with said frame an enclosure for said aquatic animals, the improvement wherein said rigid frame is a geodesic sphere.

BRIEF DESCRIPTION OF THE DRAWINGS

Preferred embodiments of the present invention will now be described in greater detail and will be better understood when read in conjunction with the following drawings in which.

DESCRIPTION OF THE PREFERRED EMBODIMENTS

Figure 1:
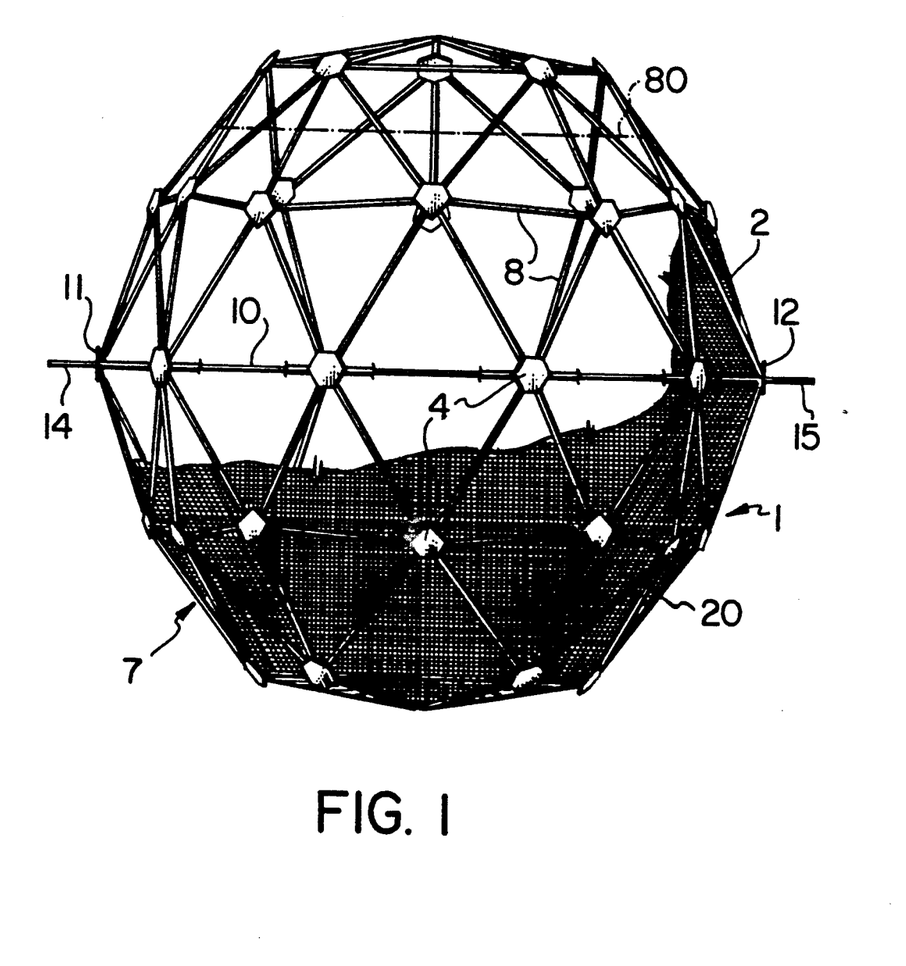
FIG. 1 is a front elevational view of a geodesic cage comprising part of the present cage system.

With reference to FIG. 1, it has been found that the use of a geodesic sphere provides a markedly superior frame compared to previous cage constructions in terms of rigidity and strength, weight, cost of construction, ease of field assembly and inherent protection against predation by birds, seals and other predatory fauna.

Cage 1 comprises a frame 2 consisting of a plurality of five or six-point connectors 4 that anchor the ends of tubular elements 8 which together define a geodesic sphere 7 typically 40 to 45 feet in diameter. Larger or smaller diameter cages are contemplated for some situations. Elements 8 may advantageously be lengths of stainless steel or aluminum pipe or some other relatively light, strong and corrosion-resistant material.

Figure 9:
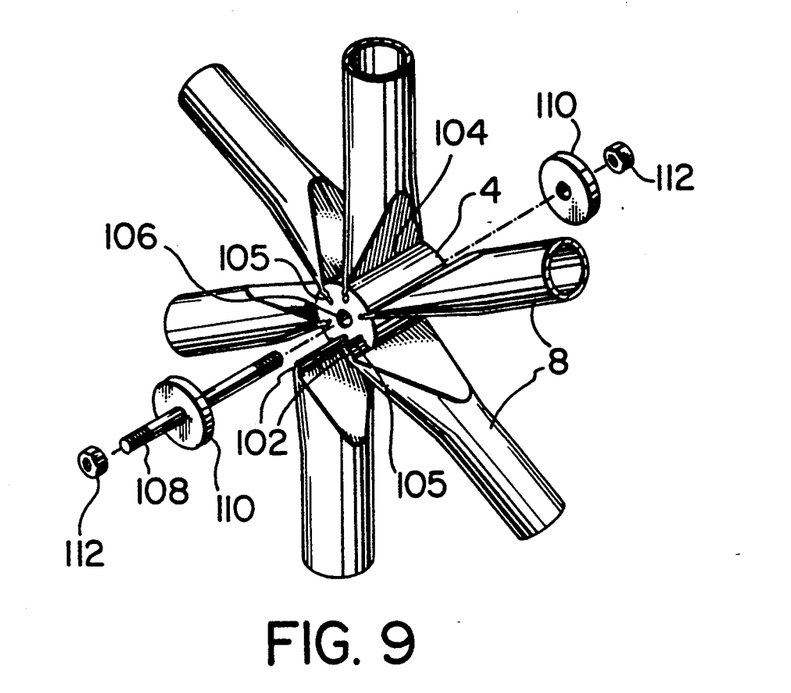
FIG. 9 is an isometric view of a connector for a geodesic cage.

The structure of frame 2 is shown in greater detail in FIGS. 9 to 13. As shown in FIG. 9, pipe elements 8 are tapered, flattened and crimped at their ends 102. Connector 4 is an extruded hub with a plurality of circumferentially spaced longitudinal slots 104 which extend the length of the connector's outer surface. The cross-sectional shape of slots 104 corresponds to the cross-sectional shape of ends 102 so that ends 102 are slidably insertable in cooperating slots 104. Ends 102 and slots 104 are provided with cooperating teeth 105 so that slots 104 radially retain pipes 8 after insertion.

Figure 23:
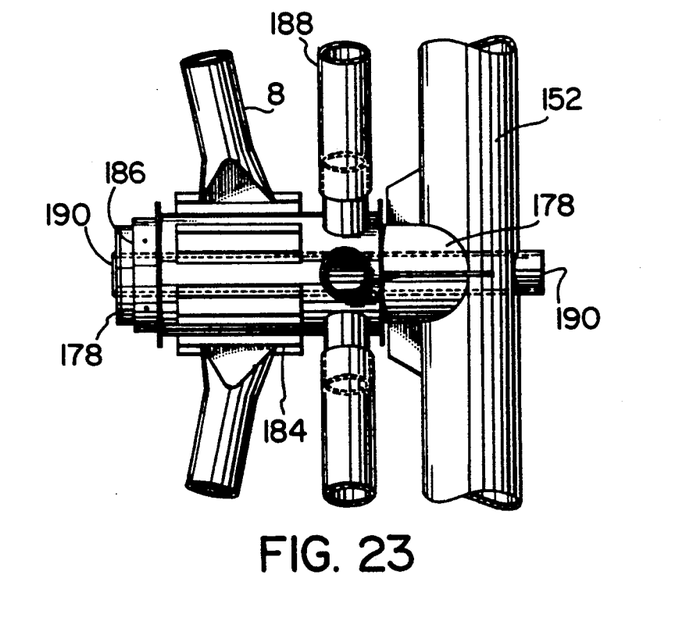
FIG. 23 is a detail view of a connector for the north apex of a geodesic cage.

As can be seen in FIG. 23, the flattened end of pipe 8 is cut at an angle so that pipe 8, when installed in connector 4, extends at an angle to the axis of connector 4. The angle is that appropriate for the "curvature" of frame 2 at the point of connection.

Axial bore 106 extends through connector 4. A threaded fastener 108 is inserted through bore 106. After ends 102 of each of pipes 8 are slidably inserted into slots 104, washers 110 are installed on fastener 108 at either end, and retained by threaded nuts 112. Washers 110 close the ends of slots 104 preventing any further sliding movement by pipes 8 which are thus firmly retained by slots 104. If preferred, threaded bolts may be substituted for fastener 108.

Figure 10:
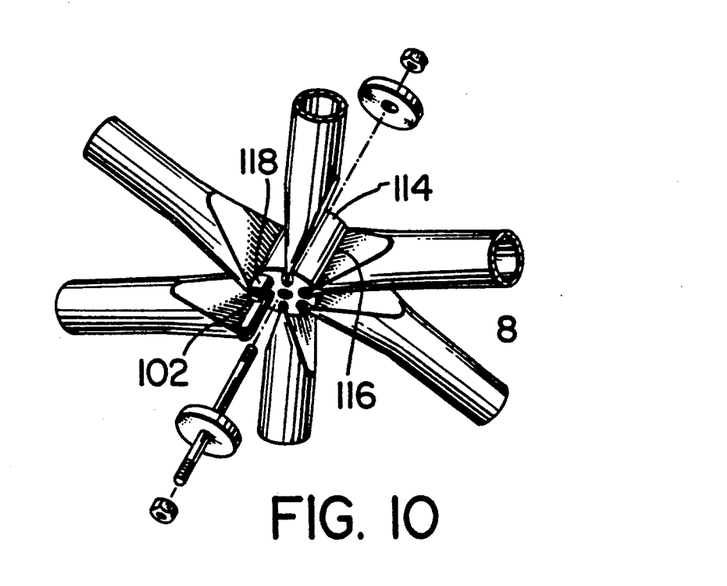
FIG. 10 is an isometric view of a connector for a geodesic cage in an alternate embodiment.

In an alternate embodiment shown in FIG. 10, connector 114 has slots 116 which are larger than the toothed ends 102 of pipes 8. A high tensile polymer insert 118 fits tightly around toothed end 102 and inside slot 116, so that end 102 together with insert 118 is slidably insertable into slot 116 and is firmly retained therein. The use of connector 114 and insert 118 facilitates assembly and disassembly by insulating end 102 from direct contact with connector 114 and thereby reducing frictional resistance. Inserts 118 also advantageously function to seal ends 102 of tubes 8 from the corrosive activity of salt water or other corrosive environments.

For use in a salt water environment, marine alloy aluminum is a preferred material for pipes 8, connectors 4,114 and washers 110, while stainless steel is preferred for fastener 108 and nuts 112.

Figure 11:
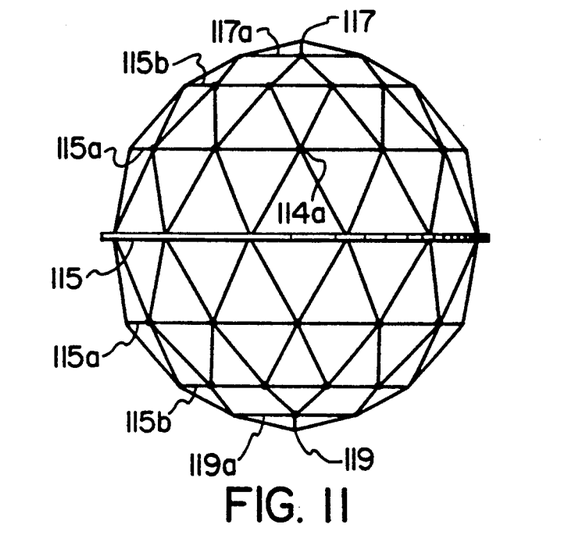
FIG. 11 is an elevation view of a geodesic cage.
Figure 12:
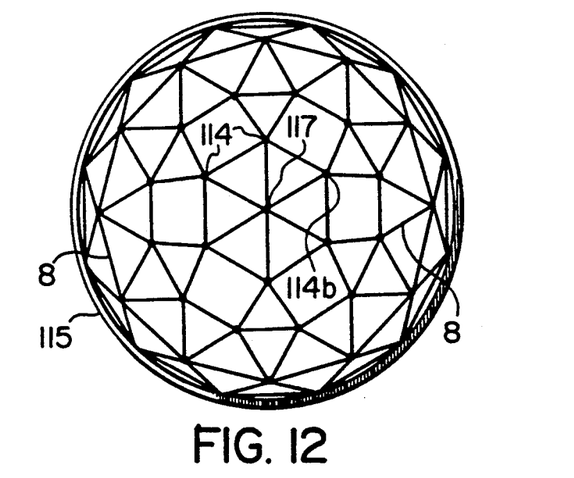
FIG. 12 is a plan view of a geodesic cage.
Figure 13:
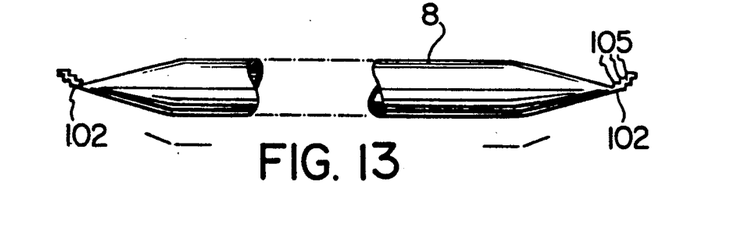
FIG. 13 is a detail of an exemplary pipe element of a geodesic cage.
Figure 14A:
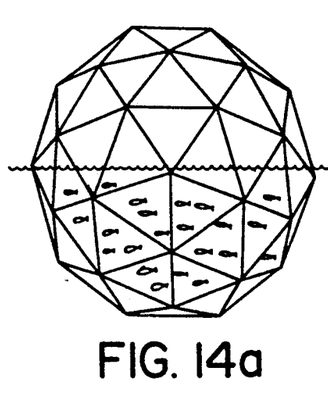
FIGS. 14a-14f are schematic illustrations of harvesting using the submersible cage system.
Figure 14B:
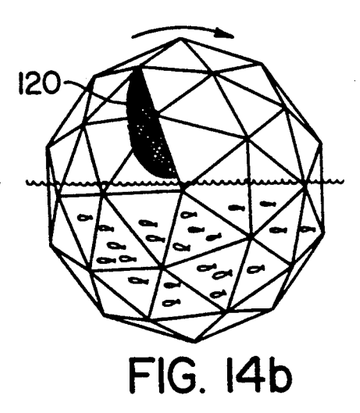
Figure 14C:
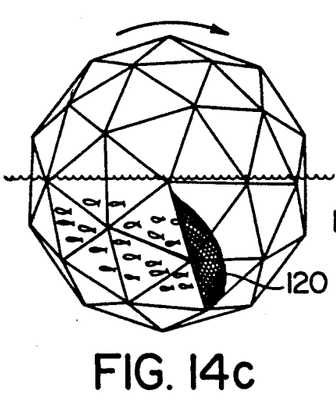
Figure 14D:
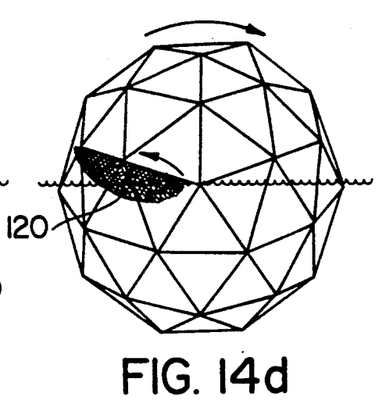
Figure 14E:
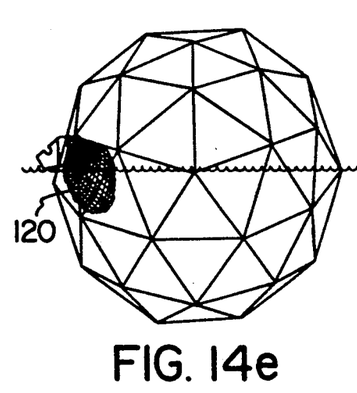
Figure 14F:
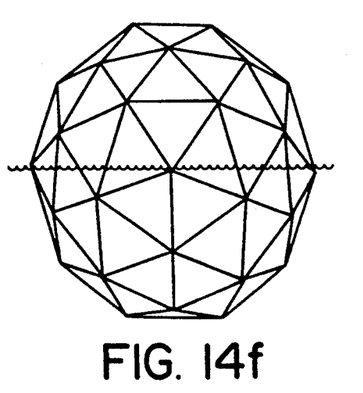
Figure 15A:
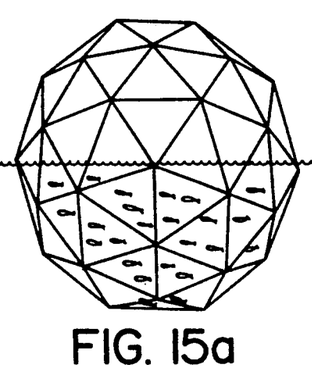
FIGS. 15a-15f are schematic illustrations of mortality removal using the submersible cage system.
Figure 15B:
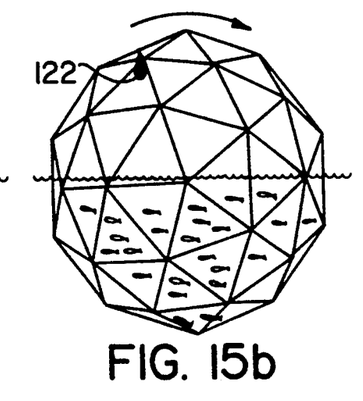
Figure 15C:
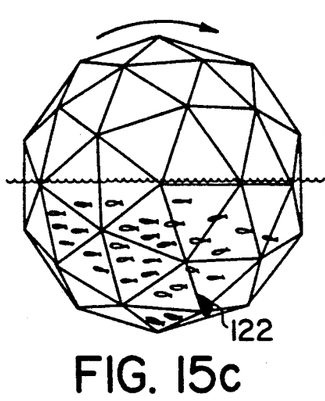
Figure 15D:
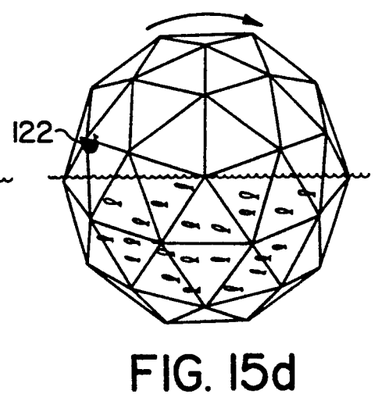
Figure 15E:
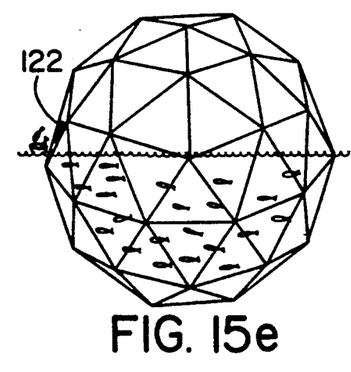
Figure 15F:
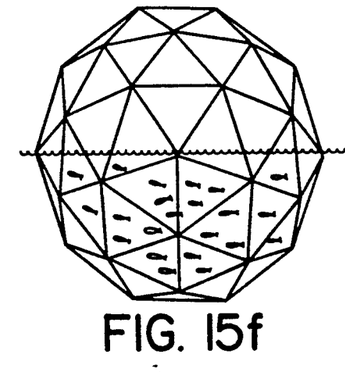
Figure 16:
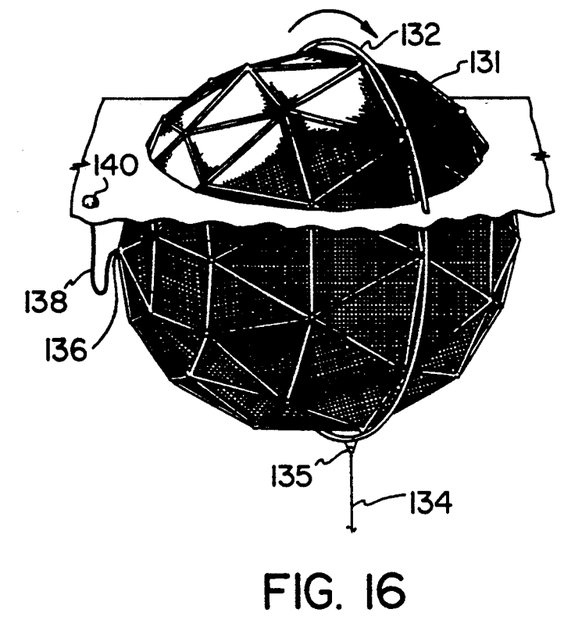
FIG. 16 is an isometric view of a portion of a submersible cage system in an alternate embodiment.

Possible alternative shapes for cage 1 include spherical, oblate spheroid, elliptical, or sausage shaped. A preferred 8-layer, spherical shape is shown in FIGS. 11 (elevation view) and 12 (plan view), suitable for exposed ocean conditions. A sphere with fewer elements 8 or having fewer layers can also be constructed for use in more protected sites. As shown in FIG. 13, elements 8 may be bent at ends 112 to enable the construction of various cage shapes using connectors 114 having equally spaced slots 116, thus facilitating manufacture and assembly. In FIGS. 11, 12 and 13, the symbol "\——" indicates a bend in an element 8 and its bend direction.

Typical slot arrangements 114a and 114b are shown in FIGS. 11 and 12. In the particular geometry illustrated in FIGS. 11 and 12, slot arrangement 114a has six equally spaced slots (applicable for the ring of connectors at the equator 115 and the two rings of connectors 115a, 115b north and south of the equator) while slot arrangement 114b has eight equally spaced slots (applicable for the rings of connectors 117a, 119a adjacent the north and south apexes 117, 119).

Cage 1 is positively buoyant. Buoyancy is provided, for example, by sealing pipes 8 at both ends to provide flotation. Buoyancy may be regulated by adding symmetrically distributed weights or floats to the structure or by deploying an air/water ballast tank.

However, the inherent buoyancy of cage 1 is preferably such that when cage 1 is optimally 66% submerged, sufficient tension is exerted on its mooring cables (described below) to stabilize the structure in a seaway. Positive buoyancy may also be maintained by filling the hollow structural elements with foam.

Cage 1 includes an axle 10 journalled through diametrically opposed connectors 11 and 12 so that ends 14 and 15 of the axle extend radially outwardly from the sphere. The sphere is itself rotatable with or about axle 10 for cleaning and harvesting purposes as will be described in greater detail below.

To complete the cage, frame 2 is covered with a taut net 20 of the appropriate mesh dimensions to retain the fish within the enclosure so formed.

Preferably, netting of nylon material is used. The netting is sewed into two half hemisphere sections (not illustrated) and continuously reinforced with bolt rope (not shown) in accordance with standards used for the manufacture of trawl netting. The netting is then attached to the inside of frame 2 with a large number of attachments so that point loads are distributed over a large number of net/frame and tube connections. A large number of such connections, together with the generally spherical shape of the net, advantageously results in reduced shock load, better load distribution and higher reliability of the net/frame connections than if fewer connections are used.

Figure 4:
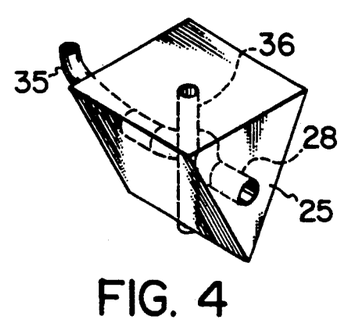
FIG. 4 is a perspective view of a flotation chamber forming part of the present system.
Figure 5:
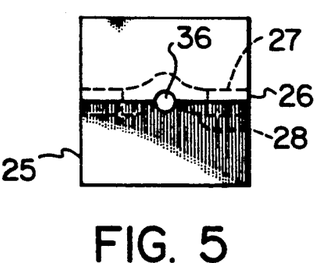
FIG. 5 is a plan, partially sectional view of the flotation chamber of FIG. 4.

Ends 14 and 15 of axle 10 each have mounted thereon a flotation chamber 25, one of these chambers being shown in greater detail with reference to FIGS. 4 and 5. Each chamber can be filled either with air to add the required degree of buoyancy to cause the cage to rest in a partially submerged condition at the water's surface 19, or with water to sink the cage into a more fully or completely submerged condition in the event of heavy weather, ice or a surface layer of lethally cold water.

As shown in FIGS. 4 and 5, chamber 25 may be triangular in transverse cross-sectional shape and includes two mutually orthogonal conduits formed therethrough. Vertical conduit 36 provides free passage for a cable 30 used to anchor the cage in a fixed location relative to the seabed as will be described below. Horizontal conduit 28 connects to an umbilical cord 35 extending from the axially outer end of the conduit to a surface float 45. Umbilical cord 35 encloses an air hose (not shown) to purge or blow flotation chambers 25 and a food duct (also not shown) to direct food from a surface tender to the interior of the cage. The umbilical cord may also include, if necessary, a reinforcing cable so that the cord is strong enough to moor the tender. The tender will have both an air pump for blowing chambers 25 and another pump for injecting waterborne nutrients below the water into the cage in predetermined amounts.

Horizontal conduit 28 is formed below the horizontal centre line of float 25 and includes at its inner end 26 a bearing 27 which journals a respective end 14/15 of axle 10. With the majority of the buoyancy provided by chamber 25 located vertically above axle 10, the chamber will be self-righting and will effectively resist rotation as cage 1 is itself rotated.

In one embodiment contemplated by the applicant, the food duct connects to journalled end 14/15 of a hollow axle 10 for delivery of the food to the interior of the cage through perforations in that portion of the axle passing through the cage's center.

Cage 1 is maintained in a fixed position relative to the seabed by means of cables 30 which pass freely through vertical conduits 36 in flotation chambers 25 and which connect at their lower ends to fixed permanent weights 42 anchored to the seabed and at their upper ends to a pair of surface floats 45. Obviously, cage 1 is free to move up and down on cables 30 to accommodate either wave motion at the water's surface or so that the cage can be raised or lowered along the cables as required.

The mechanism used either to float or submerge the cage will now be described with reference to FIGS. 2, 4 and 5. As mentioned above, cage 1 is positively buoyant and will therefore remain at the surface of its own volition typically at 50% submergence. Flotation chambers 25 can be purged of water to add additional buoyancy which facilitates maintenance, repair and harvesting of the fish within the cage. Removing more air from chambers 25 will cause the cage to remain in an approximately two-thirds submerged condition which is the normal operating position for fish culturing. Further air exhaustion from chambers 25 will cause cage 1 to descend completely below the water's surface.

Suspended from each of chambers 25 by means of fixed-length cables 39 is a counterweight 54. The two counterweights 54 collectively partially offset the positive buoyancy of cage 1. Thus, with cage 1 at the surface in a partially submerged condition, the counterweights will act as a stabilizing force to dampen wave movement that would otherwise disturb the fish. When the cage is in a fully submerged condition, counterweights 54 will rest on top of permanent weights 42 and will maintain the cage at a fixed distance above the permanent weights equal to the length of cables 39, assuming of course that chambers 25 are not purged to the point where the cage assumes negative buoyancy.

Figures 2, 3:
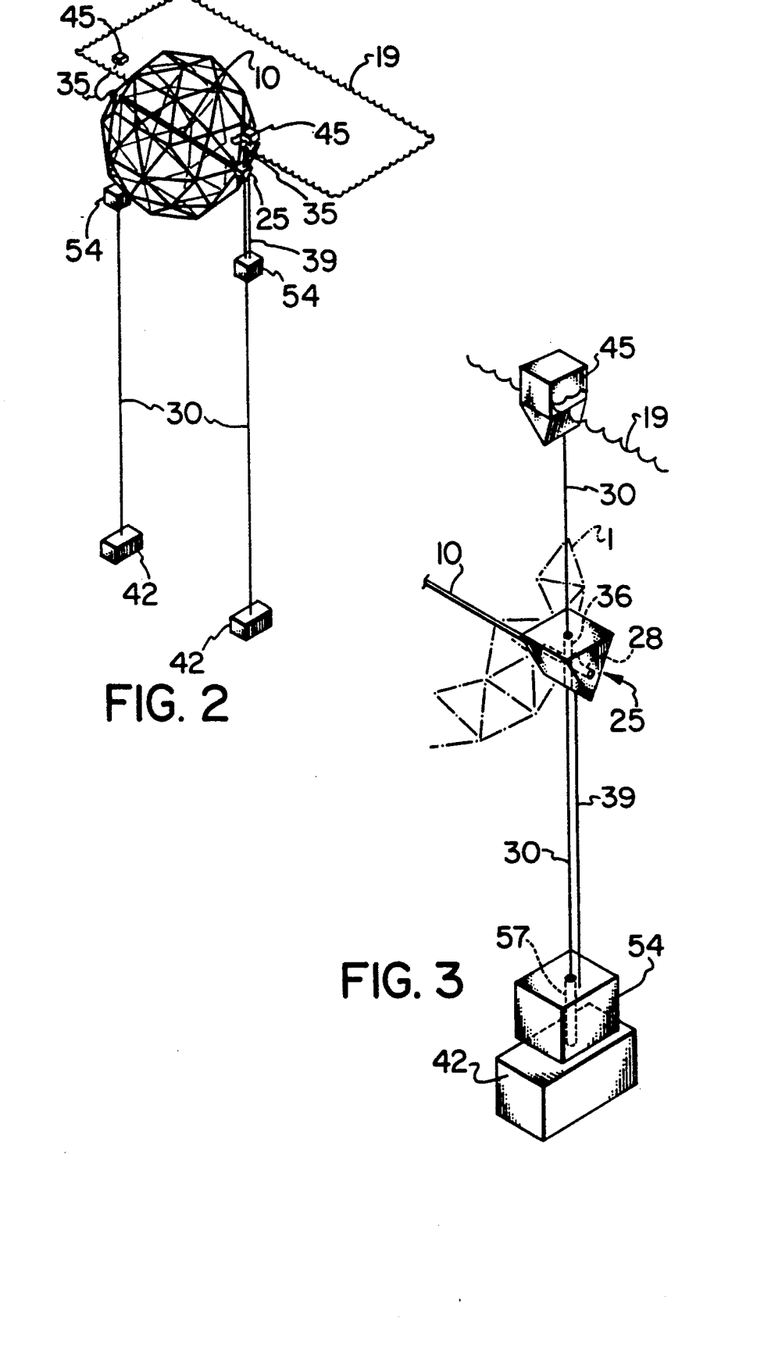
FIG. 2 is a perspective view of the present system with the cage in a partially submerged condition.
FIG. 3 is a perspective view of the present system in a fully submerged condition.

As will be seen most clearly from FIG. 3, each counterweight 54 is formed with a vertical conduit 57 which freely entrains a respective one of cables 30 for guided movement of the counterweight up and down along the cable.

Obviously, the economics of cage aquaculture improve with increased concentrations of fish stocks. Populations within individual cages can be increased only to more or less fixed levels, depending upon the species of fish being cultured, before losses due to problems with feeding, trauma and disease become excessive. Enlargement of the cages themselves permits an increase in the size of the fish stock while maintaining densities at acceptable levels, but costs, and structural and operational difficulties, increase disproportionately with increasing cage dimensions. The obvious answer is therefore to increase the number of cages per installation. The present system lends itself to this as shown with reference to FIGS. 5, 6 and 7.

Figure 6:
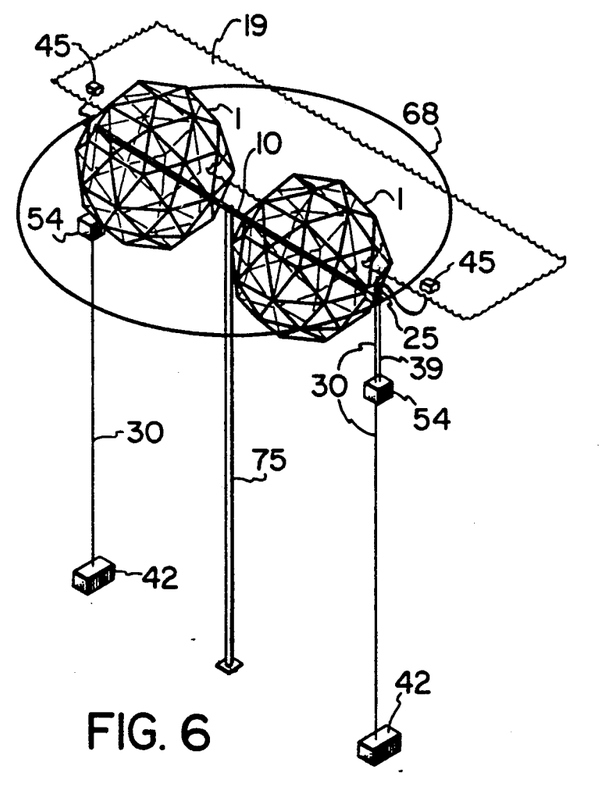
FIGS. 6, 7 and 8 are perspective views of a modified system comprising a plurality of the cages of FIG. 1 in a partially submerged condition.
Figure 7:
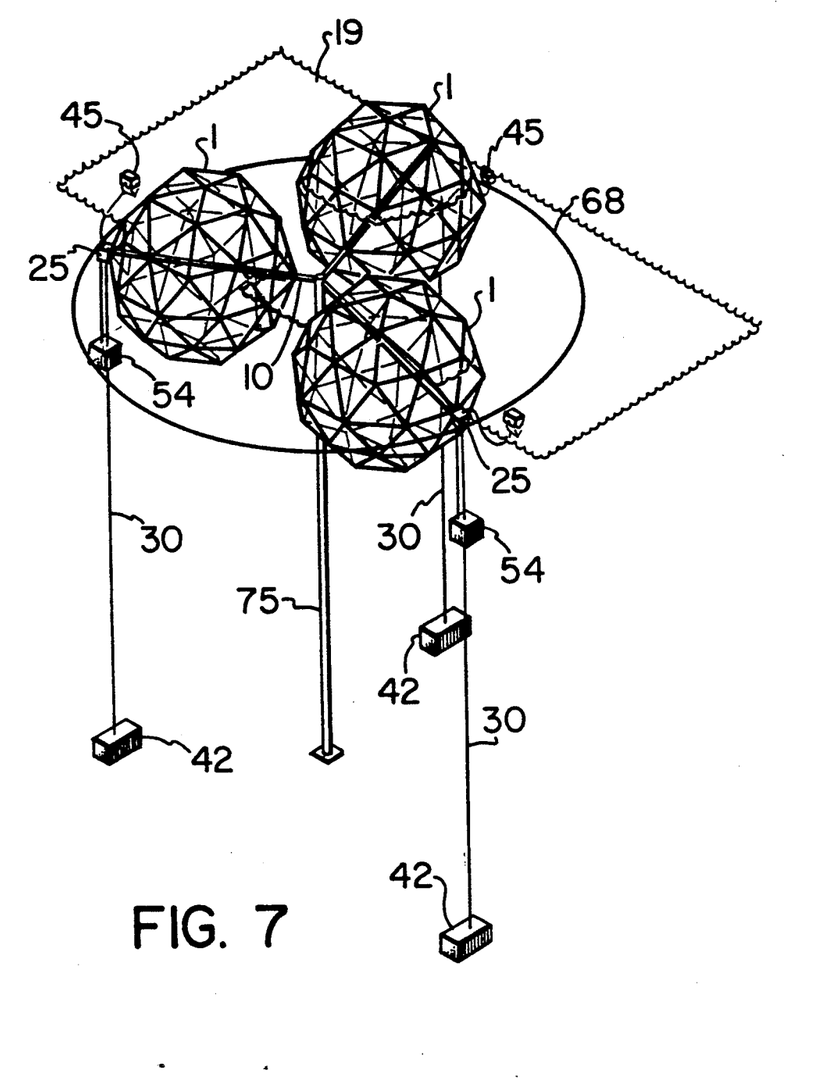
Figure 8:
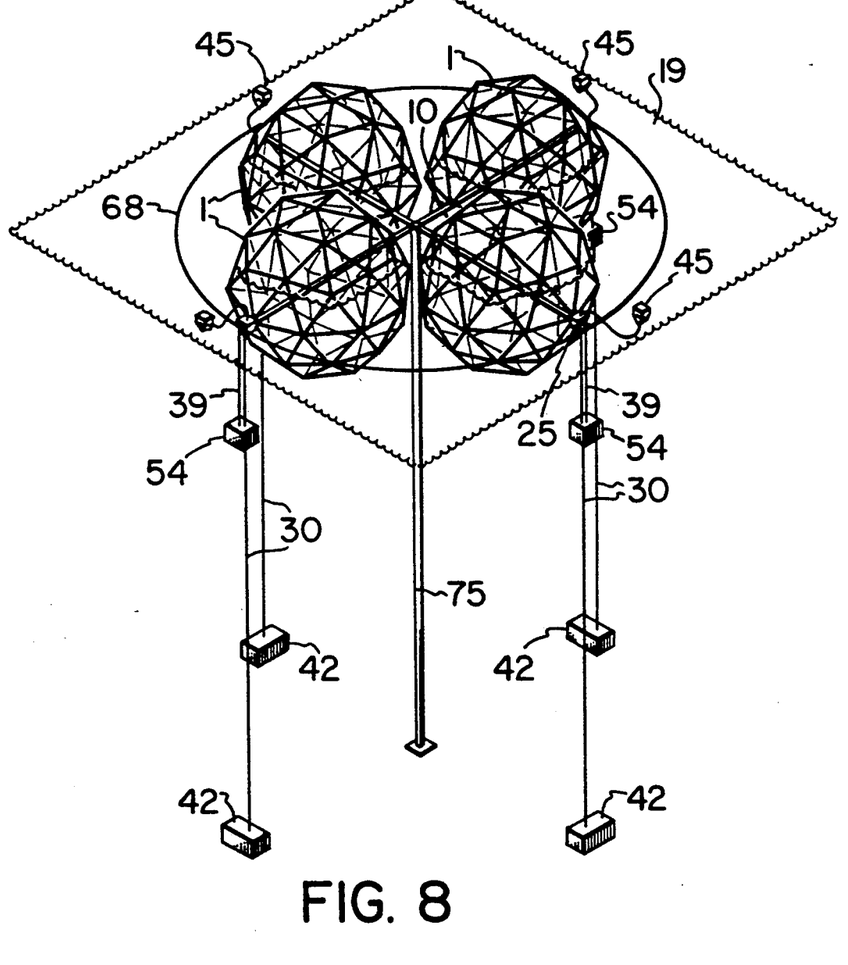

In each of FIGS. 5, 6 and 7, like elements to those appearing in the previous figures are identified using like reference numerals. The figures in question show systems incorporating 2, 3 and 4 cages, respectively, and as each system is structurally and operationally similar, reference will be made specifically to FIG. 7 showing a system having three cages.

Each cage is mounted on hubs which form axles 10. The radially inner end of each axle is slidably connected to a vertical, centrally located pylon 75 to permit up and down movement of the axle as the associated cage is itself raised and lowered to and from the water's surface. The radially outer end of each axle is connected to a hoop 68 which circumscribes all three cages. Advantageously, a radar reflector and beacon is located at the upper end of the pylon to facilitate navigation to and from the cages and to prevent collisions with passing vessels.

In other respects, the three-cage system is structurally and operationally similar to the one-cage system described above.

When submerged, the cages will become fouled with a biomass of material including barnacles, algae and other marine growths. Cleaning is easily accomplished by periodically rotating the cages while at the surface to expose successive portions of the seabed frame and net to ambient air, causing the biomass to die, dry up and then blow away in the wind. Heavily encrusted fouling can be removed by hand or by a pressurized water spray from the tender.

Some species of fish require that some free air be trapped or is capable of being trapped within the cage when fully submerged. This can be accomplished in the present system by adding an air impermeable membrane in the form of a cap or dome 80 to the cage as shown in dotted lines in FIG. 1. Obviously, when the cage is submerged, it is rotated into a position with cap 80 at the top thereof relative to the water's surface.

Methods of harvesting and mortality removal are illustrated in FIGS. 14 and 15 respectively. For harvesting, a quarter net 120 is fitted inside cage 1 from its center to its circumference. By rotating the cage through one full rotation the fish in cage 1 are harvested. By using a larger mesh size, the larger fish may be selectively harvested. For mortality removal, a small net 122 is left permanently attached to the inner circumference of cage 1. By rotating cage 1 through one full rotation, dead fish are collected and may be conveniently removed.

Alternate embodiments of the submersible cage system are illustrated in FIGS. 16 to 23. Having reference to FIG. 16, cage 131 is substantially the same as cage 1 previously described with the following differences. A vertically oriented circular track 132 surrounds cage 131 at its equator, and cage 131 is attached thereto. Cage 131 is rotated by applying tangential force along track 132. Mooring cable 134 is attached to car 135 which runs freely along track 132. As track 132 and cage 131 are rotated, car 135 moves along track 132 so the position of mooring cable 134 remains substantially stationary while cage 131 rotates. Track 132 thus eliminates the need for an axle through the cage, and provides a convenient point of attachment for mooring cable 134. However, a modified hollow hub connector 136 is provided to which feed hose 138 is pivotably connectable for supplying nutrients to the fish in cage 131.

Figure 17:
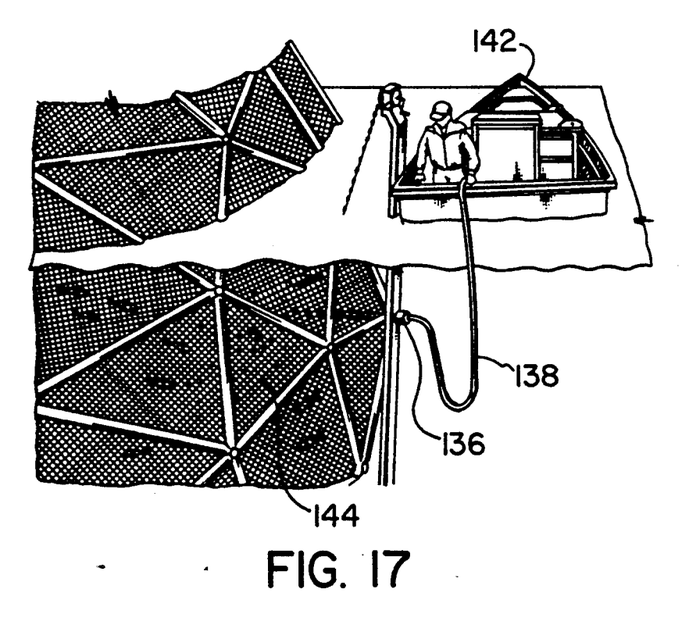
FIG. 17 is an illustration of feeding using the submersible cage system.

Hose 138 remains connected to hub 136 and, except during feeding, the free end is retained at the surface by floating buoy 140. As shown in FIG. 17, the fish are fed hydraulically from a service vessel 142 which draws up to the cage. A water pump (not shown) in vessel 142 hydraulically forces the fish food below the water through hose 138 and hub 136. The food pellets 144 are of varying densities, for example, floating, neutrally buoyant and sinking, to ensure that all the fish in cage 131, surface, midcage and bottom dwellers have access to food 144. The hydraulic feeding mechanism allows feeding of fish even when cage 131 is fully submerged.

Figure 18:
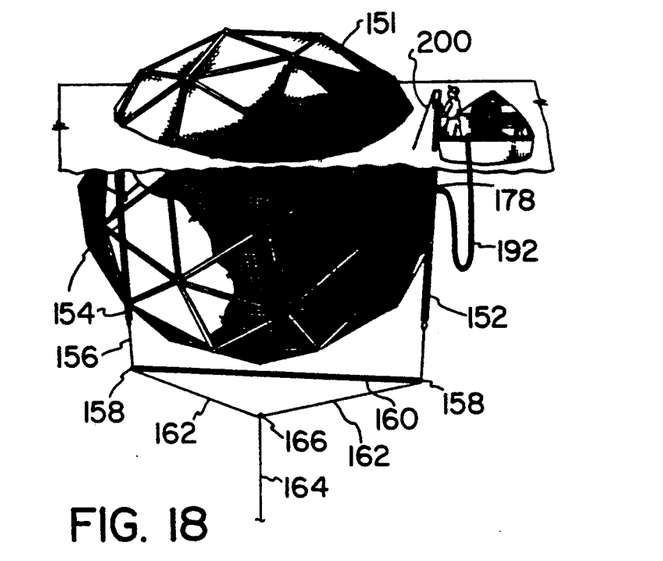
FIG. 18 is a plan view of a portion of a submersible cage system in an alternate embodiment.

Having reference to FIG. 18, cage 151 is substantially the same as cages 1 and 131 previously described with the following differences. Instead of a vertically oriented circular track 132, cage 151 is rotatably attached at its north and south apexes to stabilizer legs 152 and 154. Cables 156 extend downward and connect to the ends 158 of rigid spreader bar 160, and cables 162 connect the ends 158 of spreader bar 160 to mooring cable 164 at grommet 166. Spreader bar 160 is formed of marine grade aluminum tube filled with foam for positive or near neutral buoyancy.

An axle which extends through cage 151 is not required, but axles are provided at the north and south apexes to form a rotatable attachment of cage 151 to stabilizer legs 152 and 154. At the south apex, axle 168 (FIG. 19) is rigidly attached to stabilizer leg 154, and rotatably engages a special apical hub connector 170 which takes the place, at this point, of connectors 4 or 114 described earlier. As shown in detail in FIG. 21, connector 170 is formed of a rigid metal sleeve 172 which has a plurality of longitudinal slots 174 disposed about its outer circumference capable of slidably receiving the corresponding ends of pipes 8. The inside of sleeve 172 is circumferentially lined with nylon bushing 176 which engages axle 168 with a minimum of frictional resistance.

Figure 22:
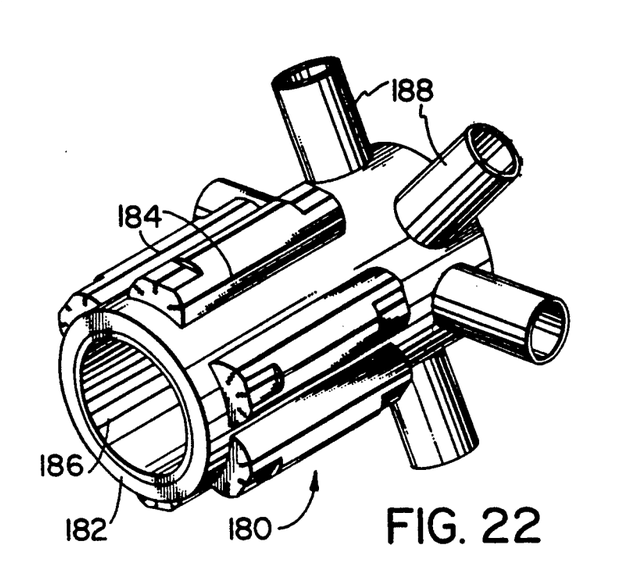

Similarly, at the north apex axle 178 is rigidly attached to stabilizer leg 152, and rotatably engages a special apical hub connector 180. As shown in FIG. 22, connector 180 includes a sleeve 182 with slots 184 for connection with pipes 8, and nylon bushing 186 for non-frictional engagement with axle 178. Sleeve 182 is extended outwardly and provided with radial spokes 188. Axle 178 has a hollow inner passage 190 which communicates with the inside of cage 151 for connection to a feeder hose 192.

Figure 19:
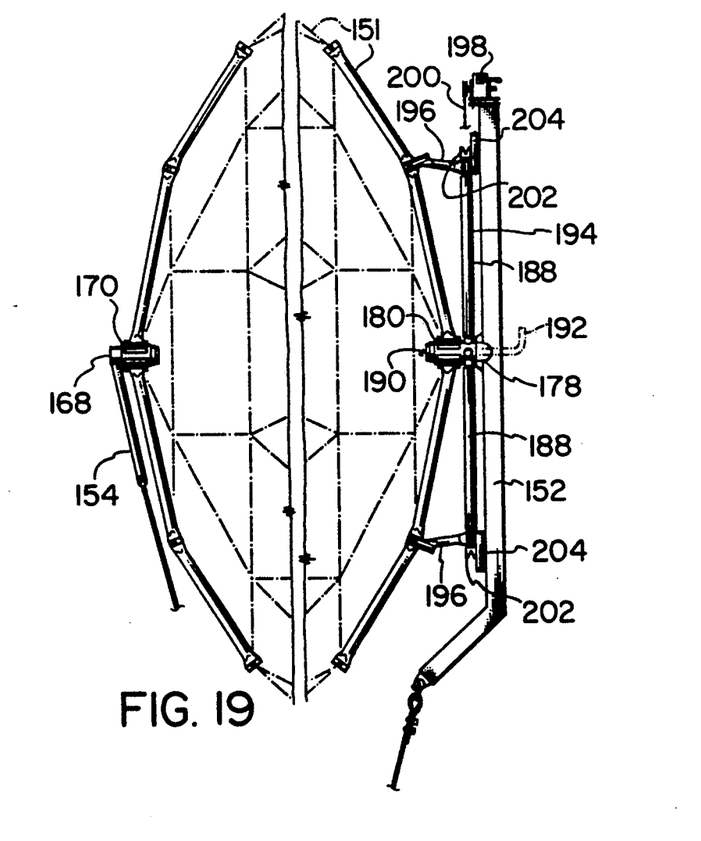
FIG. 19 is a view along the equator of a geodesic cage illustrating the rotation system of a submersible cage system.
Figure 20:
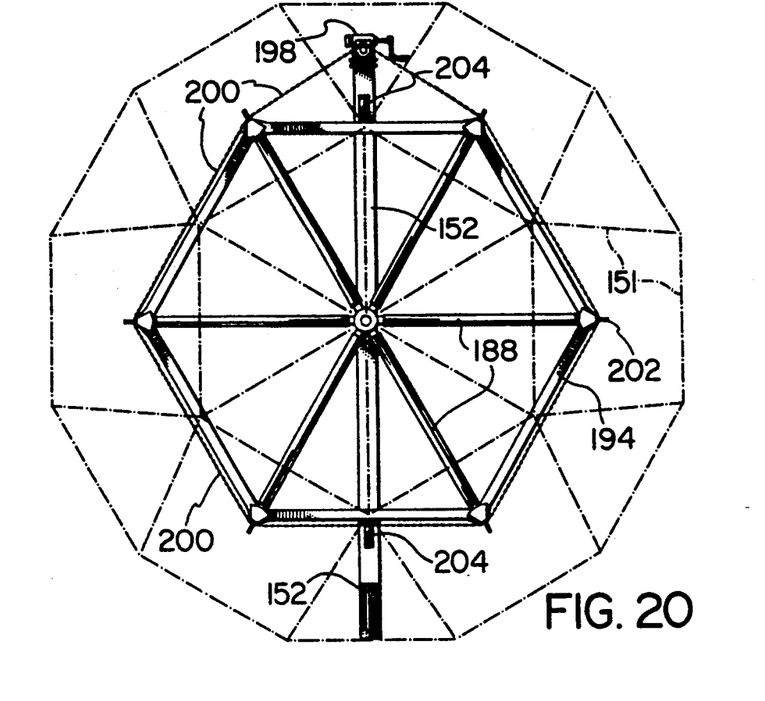
FIG. 20 is a view along the axis of a geodesic cage illustrating the rotation system of a submersible cage system.
Figure 21:
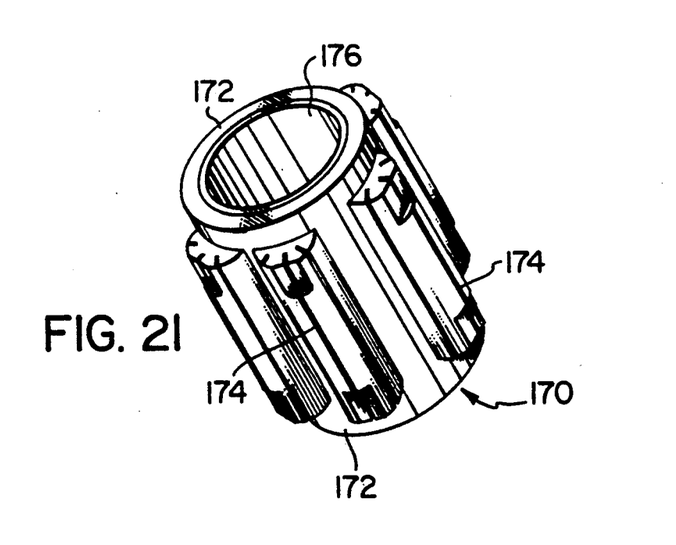
FIGS. 21 and 22 are isometric views of connectors for the south and north apexes of a geodesic cage.

A rotation system for cage 151 is shown in FIGS. 19 and 20. Spokes 188 extend radially outwardly from connector 180 to a hexagonal ring structure 194. Spokes 188 are rigidly attached to connector 180, and struts 196 reinforce the attachment of ring 194 to cage 151, so cage 151 rotates together with ring 194. Stabilizer leg 152 extends upward beyond the highest point of ring 194 and mounts a means for rotationally driving ring 194. An enclosed, hand cranked, worm-gear reduction drive unit 198 drives chain 200, which in turn drives chain sprocket 202 attached to ring 194. Guiding rollers 204 are mounted on stabilizer leg 152 at the upper and lower points of contact with ring 194 to ensure smooth rotation of cage 151 relative to stabilizer leg 152.

When cage 151 is optimally 66% submerged, drive unit 198 is above the surface of the water as shown in FIG. 18. Once every week or so, or as needed, the aquaculture operator pulls alongside the cage in a service vessel normally under calm conditions and at slack tides, and rotates the cage as needed by hand cranking drive unit 198.

Figure 24:
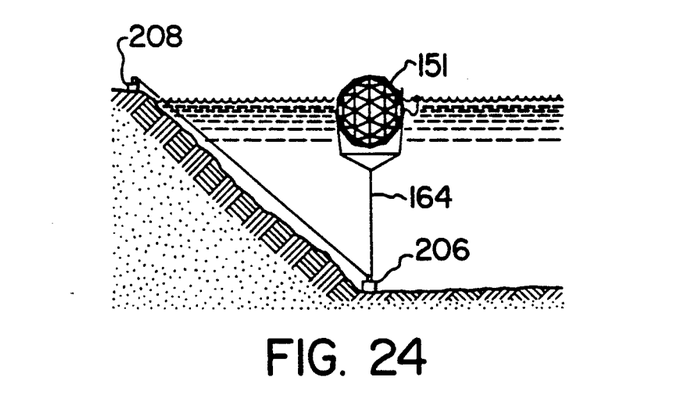
FIGS. 24, 25 and 26 are schematic illustrations of alternative mooring systems for a submersible cage system.
Figure 25:
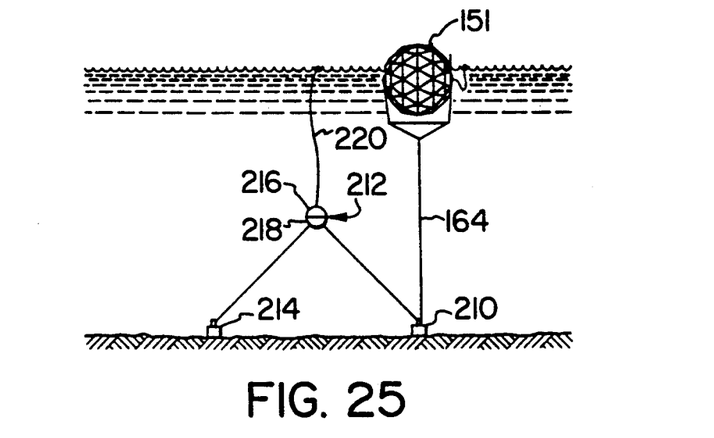
Figure 26:
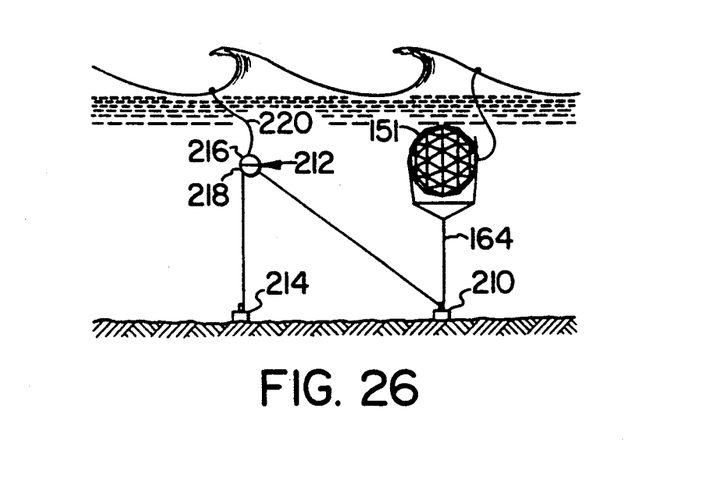

Alternative mooring systems are shown in FIGS. 24 to 26. These systems are shown with reference to cage 151, but are equally adaptable to other embodiments of the submersible cage system. For near shore aquaculture sites in relatively deep water (e.g. 80' to 100'), mooring cable 164 runs freely through block 206 (FIG. 24) which is anchored firmly in the seabed and then to a winch 208 on shore. The operator can lower cage 151 below the water surface, or raise cage 151 as the case may be, by winching cable 164 in or out.

For offshore mooring, cable 164 runs freely through a block 210 (FIGS. 25,26) which is anchored firmly in the seabed. Cable 164 next runs to a two-chambered crown buoy 212, and then is moored firmly to a ballast anchor 214 in the seabed. The upper chamber 216 of crown buoy 212 is filled with foam or other buoyant material. The lower chamber 218 of crown buoy 212 is hollow, open at its lower extremity to the water and connected at its upper extremity through a hose 220 to the air above the water surface. Under normal conditions (FIG. 25), hose 220 is left open at its upper end, which allows water to fill lower chamber 218. Upper chamber 216 of crown buoy 212 provides permanent flotation sufficient to tension mooring cable 164 and submerge cage 151 to an appropriate operating depth between 50% and 66%.

If it is desired to submerge cage 151 below the surface, for example in the event of bad weather (FIG. 26), air is forced into hose 220 which blows the water out of lower chamber 218, thereby increasing the buoyancy of crown buoy 212. The increased buoyancy provides additional upward force on cable 164 which overcomes the buoyancy of cage 151. Crown buoy 212 rises and cage 151 submerges below the surface to a predetermined depth.

As these and other variations and combinations of the features described above can be utilized without departing from the spirit of the present invention, the foregoing description of the preferred embodiments should be taken by way of illustration rather than by way of limitation of the present invention as defined in the claims.

We claim:

1. A submersible cage system for culturing aquatic animals comprising:
   a rigid geodesic frame comprising a plurality of elongated members interconnected at hubs to form contiguous predominantly triangular segments defining a spheroidal shape;
   a net supported by said rigid frame to define a water permeable enclosure for said aquatic animals;
   means for supporting said rigid frame for rotation about a horizontal axis; and
   means for anchoring said frame in a marine environment whereby said cage can be raised or lowered relative to the surface of the water.

2. The submersible cage system of claim 1 wherein said means for supporting said rigid frame for rotation about a horizontal axis comprise axially opposed hubs disposed on said rigid frame.

3. The submersible cage system of claim 2 wherein said means for supporting additionally comprise vertically oriented leg means and axle means for respectively rotatably connecting said hub means to said leg means whereby said hub means and said frame connected thereto are freely rotatable about said axle means relative to said leg means.

4. The submersible cage system of claim 3 wherein said anchoring means comprise a cross member interconnecting the lower end of said leg means and a mooring line extending downwardly from said cross member for connection to a submerged anchor.

5. The submersible cage system of claim 4 wherein said anchoring means further comprise a buoy connected to said mooring line between said cross member and said submerged anchor, said buoy having adjustable buoyancy whereby said cage can be raised or lowered relative to the surface of the water by adjusting the buoyancy of said buoy.

6. A submersible cage system for cultivating aquatic animals comprising:
   a rigid frame defining a geodesic enclosure;
   a net supported by said rigid frame to define a water permeable enclosure for said aquatic animals;
   means for supporting said rigid frame for rotation about a horizontal axis;
   flotation means disposed at opposite sides of said rigid frame, said flotation means being alternatively fillable with a gas or a liquid to increase or decrease, respectively, said cage system's buoyancy; and
   means for anchoring said frame in a fixed position in a marine environment;

said means for supporting said rigid frame for rotation comprising a hollow axle extending horizontally through said rigid frame, said axle including outer ends extending radially outwardly from said frame, said flotation means comprising a hollow chamber rotatably disposed on each of said radically extending outer ends of said axle, each said chamber including a horizontal conduit formed therethrough, a radially inner end of said conduit relative to said rigid frame being adapted for rotatable connection to said axle for fluid communication between the interior of said conduit and the interior of said axle, each said chamber being triangular in transverse cross-sectional shape, said horizontal conduit therein being formed below the horizontal center line of said chamber so that said chamber, when buoyant, is self-righting.

7. The submersible cage system of claim 6 wherein each said chamber additionally includes a vertical conduit formed therethrough.

8. The submersible cage system of claim 7 wherein said means for anchoring comprise float means disposed at the water's surface, a submerged anchor and a mooring line extending upwardly from said anchor, through said vertical conduit to said float means.

9. The submersible cage system of claim 8 comprising a plurality of said rigid frames connected together in a cluster.

10. A submersible cage system for cultivating aquatic animals comprising a rigid geodesic frame, a net supported by said rigid frame to define a water permeable enclosure for said aquatic animals, means for supporting said rigid frame for rotation about a horizontal axis, and means for anchoring said frame in a fixed position in a marine environment, wherein said means for supporting said frame for rotation about a horizontal axis comprise an external, vertically oriented circumferentially extending ring attached to said frame at spaced apart points therebetween, whereby rotation of said ring in the vertical plane results in rotation of said rigid frame about a horizontal axis thereof.

11. The submersible cage system of claim 10 wherein said anchoring means comprise a submerged anchor, car means attached to said ring to be freely movable relative thereto, and a mooring line extending between said anchor and said car means.

* * * * *